United States Patent
Ambha Madhusudhana et al.

(10) Patent No.: US 10,212,553 B1
(45) Date of Patent: Feb. 19, 2019

(54) DIRECTION DETERMINATION OF A WIRELESS TAG

(71) Applicant: Motorola Mobility LLC, Chicago, IL (US)

(72) Inventors: Nikhil Ambha Madhusudhana, Chicago, IL (US); Sudhir C. Vissa, Bensenville, IL (US); Vivek Kumar Tyagi, Chicago, IL (US); Douglas Alfred Lautner, Round Lake, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 15/679,058

(22) Filed: Aug. 16, 2017

(51) Int. Cl.
*H04W 4/02* (2018.01)

(52) U.S. Cl.
CPC .......... *H04W 4/027* (2013.01); *H04W 4/026* (2013.01)

(58) Field of Classification Search
CPC ................ H04M 1/7253; G01D 21/00; H04W 52/0216; H04W 64/00; G06K 19/07749; G06K 7/10435; G01S 5/02; G06F 21/51
See application file for complete search history.

(56) References Cited

U.S. PATENT DOCUMENTS

| | | | |
|---|---|---|---|
| 7,020,501 B1* | 3/2006 | Elliott .............. | H04W 52/0216 370/338 |
| 8,027,280 B2* | 9/2011 | Ganesh .................. | G01D 21/00 370/310 |
| 2008/0160984 A1* | 7/2008 | Benes ................. | H04M 1/7253 455/419 |
| 2009/0015407 A1* | 1/2009 | Tuttle .............. | G06K 19/07749 340/572.1 |
| 2013/0076569 A1* | 3/2013 | Alizadeh-Shabdiz .... | G01S 5/02 342/463 |
| 2013/0227681 A1* | 8/2013 | Hong ...................... | G06F 21/51 726/22 |
| 2014/0315582 A1* | 10/2014 | Dong .................... | H04W 64/00 455/456.2 |
| 2016/0258760 A1* | 9/2016 | Beaumont ............ | G01C 21/206 |
| 2016/0321481 A1* | 11/2016 | Bottazzi ............. | G06K 7/10435 |
| 2017/0200033 A1* | 7/2017 | Li ...................... | G06K 7/10366 |

* cited by examiner

*Primary Examiner* — Nizar N Sivji
(74) *Attorney, Agent, or Firm* — Wolfe-SBMC

(57) ABSTRACT

In aspects of direction determination of a wireless tag, a mobile device can receive wireless signal replies that include signal strength indicators from a wireless tag in response to wireless communications from the mobile device to the wireless tag. The mobile device can include a tracking module that is implemented to track movement of the mobile device based on motion sensor inputs, and identify a location of the mobile device based on the movement of the mobile device. The tracking module is also implemented to determine a direction toward the wireless tag relative to the location of the mobile device based on the signal strength indicators in the wireless signal replies from the wireless tag.

20 Claims, 6 Drawing Sheets

DIRECTION DETERMINATION OF A WIRELESS TAG

BACKGROUND

Wireless tags used for wireless radio-signaling, such as radio frequency identification (RFID) tags or labels, can include memory to store data that identifies a wireless tag, as well as other information about an object that the wireless tag may be associated with, such as when attached to the object or included in object packaging. Conventional systems used for localizing a RFID tag, such as used to locate an associated object, involves using multiple stationary RFID readers with high power antennas to triangulate the position of the wireless tag. This type of RFID tracking system is not cost effective to implement, difficult to scale, and requires complex setup.

Similarly, conventional augmented reality (AR) systems are difficult to implement due to operating in the visual domain, needing a line-of-sight to ascertain a real object and the position of the object in an augmented reality environment. For example, an object that is recognizable from a front view, as determined by an AR system, may not be recognized by the system from a side, back, or top view of the object. This type of visual object detection utilizes a great deal of processing power and requires system training to visually recognize an object from multiple perspectives. Additionally, an AR system is subject to other visual-based challenges, such as occlusion and poor lighting that can limit recognizing the features of an object.

BRIEF DESCRIPTION OF THE DRAWINGS

Aspects of direction determination of a wireless tag are described with reference to the following Figures. The same numbers may be used throughout to reference like features and components that are shown in the Figures.

DETAILED DESCRIPTION

Figure 1:
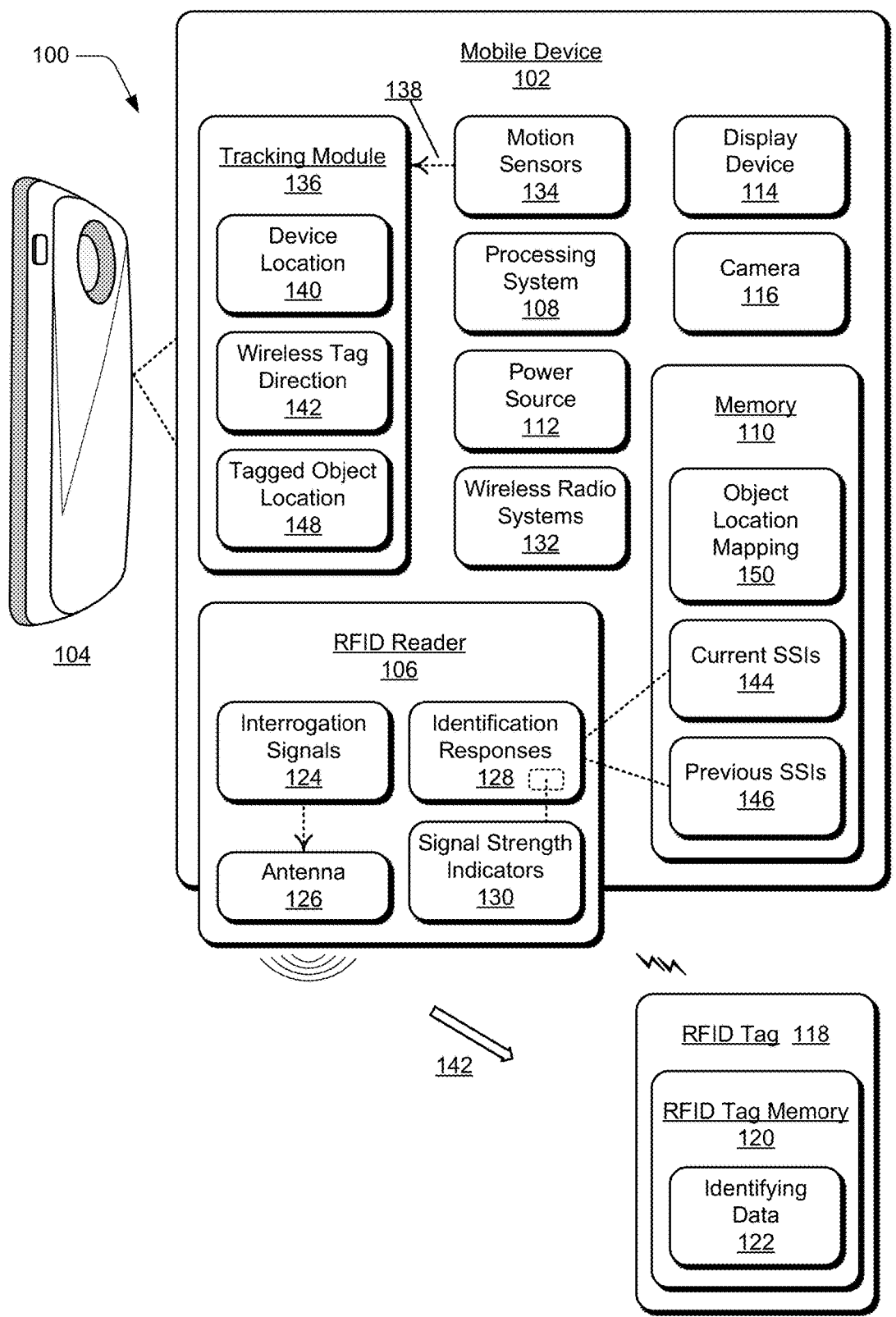
FIG. 1 illustrates an example system in which aspects of direction determination of a wireless tag can be implemented.

Direction determination of a wireless tag is described, and may be implemented by a mobile device that includes a radio frequency identification (RFID) reader, such as a mobile phone that includes the RFID reader either as an integrated component or as an attachment that operates with the mobile phone. The RFID reader transmits interrogation signals via an antenna as broadcast messages requesting RFID tags that are in range to return identifying data stored in memory of the RFID tags. The identifying data includes a unique identifier of each particular RFID tag, and can also include an identification of an object that the RFID tag is associated with. A RFID tag can be associated with any type of object or item, such as by being placed in or affixed to an object for inventory tracking, item location, item recovery, and the like.

The RFID reader receives identification responses from one or more of the RFID tags in response to the interrogation signals transmitted by the RFID reader, and the identification responses include signal strength indicators, such as a received signal strength indication (RSSI) that indicates the strength of a received response from a RFID tag. The mobile device also includes motion sensors, such as in an inertial measurement unit (IMU), to sense motion of the mobile device as a user moves and changes orientations of the device and/or as the device moves with the user to various different locations.

The mobile device implements a tracking module that receives motion sensor inputs from the motion sensors as an indication that the mobile device is changing orientation in three-dimensional space and/or changing locations as the device moves with the user of the device. The tracking module is implemented to track movement of the mobile device based on the motion sensor inputs, and can identify a location of the mobile device relative to the environment in which the mobile device is located. The tracking module can also initiate the RFID reader scanning for RFID tags by transmitting the interrogation signals based on the motion sensor inputs that indicate a change in orientation and/or location of the mobile device. The tracking module can then determine the direction toward a RFID tag relative to the location of the mobile device based on the signal strength indicators that are received in the identification responses from the RFID tag.

In aspects of direction determination of a wireless tag, the tracking module is implemented to compare the signal strength indicators of previous and current identification responses from the RFID tag over time, and determine the direction toward the RFID tag from the current location of the mobile device based on the stronger signal strength. A stronger signal strength indicates that the RFID tag is more aligned with a direction of the antenna of the RFID reader. The tracking module can also determine the location of a tagged object that is associated with the RFID tag based on the direction toward the RFID tag, the current location of the mobile device, and based on the comparison of the current and previous signal strength indicators over time.

In implementations, the determined location of a tagged object that is associated with the RFID tag is usable as a basis to visually represent the object in an augmented reality (AR) system. For example, a mobile phone with a camera, integrated display device, and the RFID reader can be implemented as an augmented reality system to display the location of the object relative to the location of the mobile device. The tracking module can generate an object location mapping of an augmented reality environment, where real objects in the environment are mapped according to their relative location based on the determined direction determination of a wireless tag associated with each of the respective objects in the environment.

The use of radio-based RFID signaling is effective to overcome the problem that augmented reality systems operate in the visual domain, needing a line-of-sight to ascertain the position of a real object in the augmented reality environment. The use of radio-based wireless tags also overcomes other problems associated with a visual-based system, such as occlusion, poor lighting, recognizing the features of an object, and the like. Further, a radio-based wireless tag can readily identify the direction and/or location of an associated object in an augmented reality environment from any perspective, even from behind a user and without the need of visual recognition. It should also be noted that although features and aspects of direction determination of a wireless tag are described and illustrated in the context of RFID tags, the described features and aspects can be implemented with various different radio-based, wireless tag signaling, such as with LTE, RTLS, NFC, and the like.

While features and concepts of direction determination of a wireless tag can be implemented in any number of different devices, systems, environments, and/or configurations, aspects of direction determination of a wireless tag are described in the context of the following example devices, systems, and methods.

FIG. 1 illustrates an example system 100 in which aspects of direction determination of a wireless tag can be implemented. The example system 100 includes any type of a mobile device 102, such as a mobile phone 104 or tablet device that includes a radio frequency identification (RFID) reader 106, either as an integrated component of the mobile device 102 or as an attachment that operates with the mobile device. Generally, the mobile device 102 is any type of an electronic and/or computing device implemented with various components, such as a processing system 108 and memory 110, as well as any number and combination of different components as further described with reference to the example device shown in FIG. 6. For example, the mobile device 102 can include a power source 112 to power the device, such as a rechargeable battery and/or any other type of active or passive power source that may be implemented in an electronic and/or computing device. The mobile device 102 can also include an integrated display device 114 and a camera 116.

The example system 100 can include any number of RFID tags, such as RFID tag 118, which has a RFID tag memory 120 that stores identifying data 122 as a unique identifier of the particular RFID tag. Generally, RFID tags are small electronic tags or labels that can be programmed with data and other information stored in the RFID tag memory 120. The RFID tag 118 can be associated with any type of object or item, such as by being placed in or affixed to an object for inventory tracking, item location, item recovery, and the like. The RFID tag 118 is implemented for two-way wireless communication with the RFID reader 106 (also referred to as a RFID interrogator) that interrogates the RFID tag 118 for the identifying data 122 stored in the RFID tag memory 120. The RFID reader 106 can transmit interrogation signals 124 via an antenna 126 (or antenna system) as broadcast messages requesting RFID tags that are in range to return the identifying data stored in memory of the RFID tags. The antenna 126 may be a directional antenna or an omnidirectional antenna, usable by the RFID reader 106 to transmit the interrogation signals 124 to RFID tags.

The RFID tag 118 can receive an interrogation signal 124 from the RFID reader 106 and then wirelessly communicate the identifying data 122 back to the RFID reader via a radio frequency (RF) communication channel, which the RFID reader 106 receives as identification responses 128. The identification responses 128 received by the RFID reader 106 from the RFID tag 118 can be communicated using low frequency (LF), high frequency (HF), or ultra-high frequency (UHF) radio waves. The identification responses 128 from the RFID tag 118 also include signal strength indicators 130, such as received signal strength indications (RSSI) that indicate the power present in the received radio signals (e.g., the identification responses 128) from the RFID tag 118.

In addition to the RFID implementation, the mobile device 102 can include various, different wireless radio systems 132, such as for Wi-Fi, Bluetooth™, Mobile Broadband, LTE, Near Field Communication (NFC), or any other wireless radio system or format for communication via respective wireless networks. Generally, the mobile device 102 implements the wireless radio systems 132 that each include a radio device, antenna, and chipset implemented for cellular, wireless, and/or other network communication with other devices, networks, and services. A wireless radio system 132 can be configured to implement any suitable communication protocol or standard. Although features and aspects of direction determination of a wireless tag are described and illustrated in the context of RFID tags, the described features and aspects can be implemented with various different radio-based, wireless tag signaling, such as with LTE, NFC, and the like.

The mobile device 102 includes motion sensors 134 (or a single motion sensor) to sense motion of the mobile device 102 as a user moves and changes orientations of the device and/or as the device moves with the user to various different locations. The motion sensors 134 can be implemented with various sensors, such as a gyroscope, an accelerometer, and/or other types of motion sensors to sense motion of the mobile device. The various motion sensors 134 may also be implemented as components of an inertial measurement unit in the mobile device. The motion sensors 134 generate sensor data vectors having three-dimensional parameters (e.g., rotational vectors in x, y, and z coordinates) indicating position, location, and/or orientation of the mobile device 102. For example, a user of the mobile device 102 may hold the device in any orientation, such as vertical (perpendicular) as shown in the figure, horizontal (parallel), or at any other angle and rotational orientation.

The mobile device 102 includes a tracking module 136 that implements features of direction determination of a wireless tag, as described herein. The tracking module 136 may include independent processing, memory, and logic components as a computing and/or electronic device integrated with the mobile device 102. Alternatively or in addition, the tracking module 136 can be implemented as a software application or software module, such as computer-executable software instructions that are executable with a processor (e.g., with the processing system 108). As a software application, the tracking module 136 can be stored on computer-readable storage memory (e.g., the memory 110), or any suitable memory device or electronic data storage implemented with the tracking module.

The tracking module 136 receives motion sensor inputs 138 from the motion sensors 134. The motion sensor inputs 138 are an indication to the tracking module 136 that the mobile device 102 is changing orientation in three-dimensional space and/or changing locations as the device moves with a user of the device. The tracking module 136 is implemented to track movement of the mobile device 102 based on the motion sensor inputs 138 and can identify a device location 140 of the mobile device relative to the environment in which the mobile device is located. The tracking module 136 can also initiate the RFID reader 106 scanning for RFID tags by transmitting the interrogation signals 124 based on the motion sensor inputs 138 (e.g., the rotational vectors input from the motion sensors 134). Additionally, the tracking module 136 is implemented to determine a wireless tag direction 142 toward the RFID tag 118 relative to the location of the mobile device 102 based on the signal strength indicators 130 that are received in the identification responses 128 from the RFID tag.

The tracking module 136 is implemented to compare the signal strength indicators 130 of previous and current identification responses 128, and determine the wireless tag direction 142 toward the RFID tag 118 from the current device location 140 of the mobile device 102 based on the stronger signal strength. A stronger signal strength indicates that the RFID tag 118 is more aligned with a direction of the antenna 126 of the RFID reader 106. The device memory 110 can be utilized to maintain the current signal strength indicators 144 as well as the previous signal strength indicators 146 from the received identification responses 128. The tracking module 136 can utilize the previous and current signal strength indicators over time to determine the wireless tag direction 142 toward the RFID tag 118 relative to the device location 140 of the mobile device 102 based on a comparison of the signal strength indicators of the previous and current identification responses.

As noted above, the RFID tag 118 can be associated with any type of object or item, such as for item tracking and/or location determination. The tracking module 136 can determine a tagged object location 148 of an object that is associated with the RFID tag 118 based on the wireless tag direction 142 toward the RFID tag, the device location 140 of the mobile device 102, and based on the comparison of the signal strength indicators 130 over time (e.g., the current signal strength indicators 144 and the previous signal strength indicators 146). In implementations, the determined tagged object location 148 of the object that is associated with the RFID tag 118 is usable as a basis to visually represent the object in an augmented reality (AR) system. The mobile device 102, such as the mobile phone 104 with the camera 116, integrated display device 114, and the RFID reader 106 can be implemented as an augmented reality system to display the location of an object relative to the location of the mobile device.

The direction and/or location of the object (e.g., a RFID tagged object) can be mapped and displayed on the integrated display device 114 of the mobile device 102, such as to indicate where the object that is associated with the RFID tag 118 is located relative to the mobile device 102 in an environment in which the object and mobile device are located. For example, the tracking module 136 can generate an object location mapping 150 of an augmented reality environment, where real objects in the environment are mapped according to their relative location based on the determined direction of a wireless tag associated with each of the respective objects in the environment. Directions to the object can be displayed for the user of the mobile device 102, such as to move left, or right, or to turn-around, and locate the object that is associated with the RFID tag 118.

The use of radio-based RFID signaling is effective to overcome the problem that augmented reality systems operate in the visual domain, needing a line-of-sight to ascertain the position of a real object in the augmented reality environment. The use of radio-based wireless tags also overcomes other problems associated with a visual-based system, such as occlusion, poor lighting, recognizing the features of an object, and the like. For example, an object that is recognizable from a front view, as determined by an augmented reality system, may not be recognized by the system from a side, back, or top view of the object. This type of visual object detection utilizes a great deal of processing power and requires system training to visually recognize an object from multiple perspectives. Alternatively, a radio-based wireless tag (e.g., the RFID tag 118) can readily identify the direction and/or location of an associated object in an augmented reality environment from any perspective, even from behind a user and without the need of visual recognition.

Figure 2:
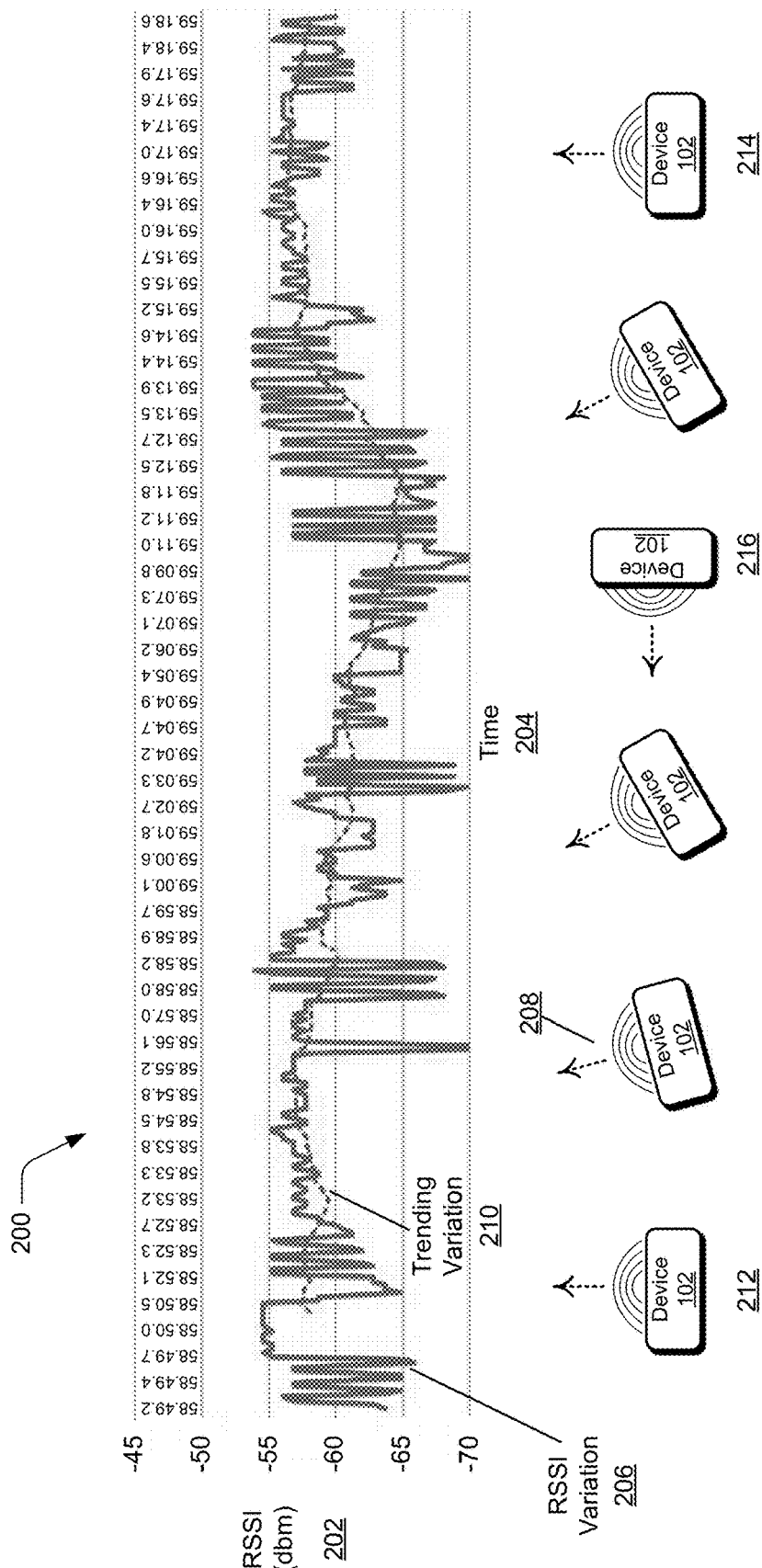
FIG. 2 illustrates an example diagram of direction determination of a wireless tag in accordance with one or more implementations of the techniques described herein.

FIG. 2 illustrates an example diagram 200 of direction determination of a wireless tag as described with reference to the mobile device 102 shown in FIG. 1. In this example diagram 200, the orientation of the mobile device 102, along with the antenna 126 of the RFID reader 106, is rotated relative to the location of the RFID tag 118. The received signal strength indications (RSSI) 202 that indicate the signal strength in the identification responses 128 from the RFID tag 118 are charted over a scan period of time 204. The diagram 200 shows an RSSI variation 206 of the received signal strength indicators 130 (e.g., the RSSI 202) in correlation with a current orientation and/or rotation of the mobile device 102. The example direction arrow 208 for each instance of the mobile device orientation and/or rotation indicates the direction that the antenna 126 of the RFID reader 106 of the mobile device 102 is facing. The diagram 200 also shows a trending variation 210 of the RSSI 202, and the tracking module 136 can use the trending variation 210, along with inertial measurement unit (IMU) data (e.g., the motion sensor inputs 138) to determine the wireless tag direction 142 relative to the device location 140 of the mobile device 102.

As indicated in the example diagram 200, the strongest signal strength at approximately −55 dbm occurs at the first illustrated orientation 212 of the mobile device 102 and at the last illustrated orientation 214 of the mobile device. This indicates the direction of the RFID tag 118 relative to the device location 140 of the mobile device. Further, the example diagram 200 indicates that the weakest signal strength at approximately −70 dbm occurs at the illustrated orientation 216 of the mobile device 102. Additionally, the direction toward the RFID tag 118 relative to the device location 140 of the mobile device 102 may also be based on a known angle of the antenna 126 relative to the plane of the mobile device in the environment. That is to say, the antenna 126 of the RFID reader 106 may not be specifically perpendicular or parallel to the plane of the mobile device 102, and any offset of the antenna 126 relative to the position and/or orientation of the mobile device can be taken into account by the tracking module 136 when determining the direction toward the RFID tag 118 relative to the device location 140 of the mobile device.

As noted above, the tracking module 136 is implemented to compare the signal strength indicators 130 of previous and current identification responses 128, and determine the wireless tag direction 142 toward the RFID tag 118 from the current device location 140 of the mobile device 102 based on the stronger signal strength. This comparison of the current signal strength indicators 144 to the previous signal strength indicators 146 from the received identification responses 128 over time is effective to eliminate attenuation caused by an object that may at least partially obstruct the identification responses 128 from the RFID tag. This scan delta of the signal strength over time accounts for the attenuation that may be caused by the surface area of the mobile device 102 and/or the effect of how a user holds the mobile device.

The scan delta of the signal strength over time also takes into account attenuation from a human body and any other stationary objects in the communication path between the RFID reader 106 and the RFID tag 118 because the attenuation is merely a constant between the first scan and subsequent scans (e.g., the interrogation signals 124 are the scans). For example, the attenuation will be a constant with respect to a user holding the mobile device 102 when the RFID tag 118 is behind the user. Given that the RFID reader 106 may be installed externally on the back of the mobile device 102 with the antenna 126 facing away from the user who is holding the mobile device, the signal strength indicators 130 may indicate the direction toward the RFID tag 118 is behind the user. The tracking module 136 is implemented to account for the attenuation constant of the user in the communication path by utilizing the pattern changes of the RSSI variation 206 in the example diagram 200, as noted by the trending variation 210, rather than using just the absolute values of the RSSI 202 as measured at particular times 204.

Figure 3:
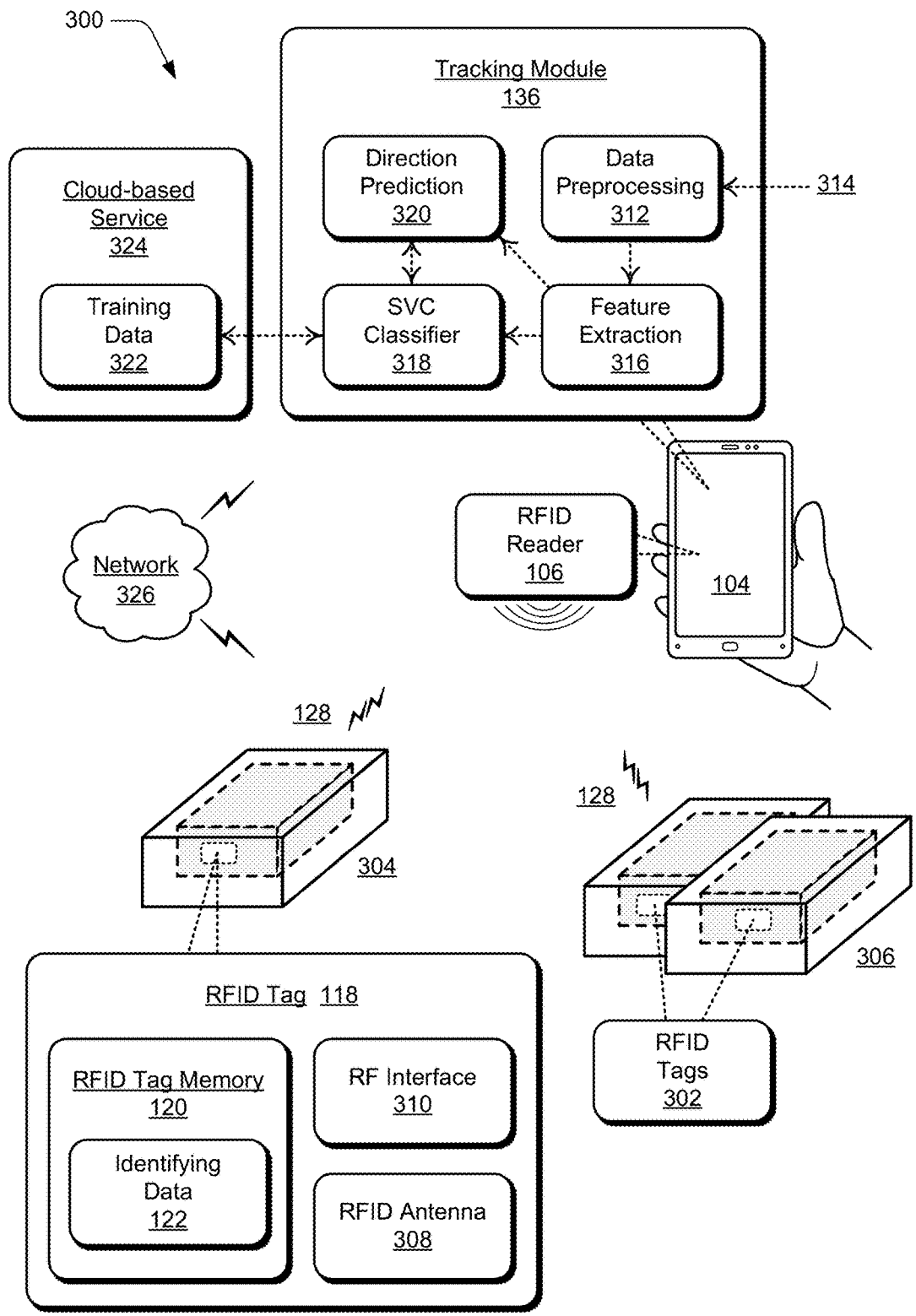
FIG. 3 further illustrates an example system in which aspects of direction determination of a wireless tag can be implemented.

FIG. 3 further illustrates an example system 300 for direction determination of a wireless tag as described with reference to the mobile device 102 shown in FIG. 1. As noted above, the mobile phone 104 is an example of the mobile device 102, and includes the RFID reader 106 either as an integrated component of the mobile phone 104 or as an attachment that operates with the mobile phone. The RFID reader 106 can transmit the interrogation signals 124 as broadcast messages requesting RFID tags that are in range to return the identifying data stored in memory of the RFID tags. The example system 300 includes any number of RFID tags 302, to include the RFID tag 118 that is associated with an object 304. The RFID tags 302 are also each associated with a respective object 306 in the environment of the example system.

The RFID tag 118 is representative of each of the RFID tags 302 having the RFID tag memory 120 that stores the identifying data 122 as a unique identifier of a particular RFID tag. The identifying data 122 may also include an indication or identifier of a respective object 306 that is associated with a particular RFID tag 302, such as the object 304 that is associated with the RFID tag 118. The RFID tag 118 is implemented for two-way wireless communication with the RFID reader 106 that interrogates the RFID tags for the identifying data 122 stored in the RFID tag memory 120. The RFID tag 118 includes a RFID antenna 308 and a RF interface 310 as a transceiver for two-way communication with the RFID reader 106. In response to receipt of an interrogation signal 124 from the RFID reader 106, an ASIC/CPU module of the RFID tag 118 formulates a response that includes the identifying data 122 from the RFID tag, and the response is wirelessly transmitted to the RFID reader. The identification responses 128 from the RFID tag 118 can be communicated using low frequency (LF), high frequency (HF), or ultra-high frequency (UHF) radio waves.

Additional components of the tracking module 136 that implement features of direction determination of a wireless tag are shown in this example system 300. The tracking module 136 includes data preprocessing 312 that receives inputs 314 as the inertial measurement unit (IMU) data (e.g., the motion sensor inputs 138), as well as the RSSI data that is received as the signal strength indicators 130 included in the identification responses 128 from the respective RFID tags 302. The tracking module 136 also includes a component for feature extraction 316, which is implemented to extract and correlate the data for the RSSI variation 206 and the trending variation 210 with the IMU data (e.g., the motion sensor inputs 138) relative to the orientation and location of the mobile phone 104.

The output of the component for feature extraction 316 is input to a support vector classifier (SVC) classifier 318, and is also an input to a component for direction prediction 320 of the wireless tag direction 142 towards a RFID tag relative to the device location 140 of the mobile phone 104. The wireless tag direction 142 can be determined by the tracking module 136 as the direction prediction 320 based on the data output from the feature extraction 316. Additionally, the SVC classifier 318 is trained over time to learn predicting the location and direction of the RFID tags 302 relative the device location of the mobile phone 104.

The SVC classifier 318 can be implemented as a form of learning algorithm, or algorithms, that analyze the feature extraction data for classification analysis to recursively develop and train a model for predicting the direction toward a wireless tag relative to the location of the mobile phone 104. The SVC classifier 318 can be trained over time based on the current input from the component for feature extraction 316 and based on training data 322 that is maintained by a cloud-based service 324, which is accessible by the mobile phone 104 over a network 326.

The network 326 generally represents any type of communication and data network, and any of the servers and devices described herein can communicate via the network 326 (or combination of networks), such as for data communication between the tracking module 136 of the mobile phone 104 and a server of the cloud-based service 324. The network 326 can be implemented to include a wired and/or wireless network. The network 326 can also be implemented using any type of network topology and/or communication protocol, and can be represented or otherwise implemented as a combination of two or more networks, to include cellular networks, IP-based networks, and/or the Internet. The network 326 may also include mobile operator networks that are managed by a network provider of a cellular network, a mobile network operator, and/or other network operators, such as a communication service provider, mobile phone provider, and/or Internet service provider.

Example methods 400 and 500 are described with reference to respective FIGS. 4 and 5 in accordance with implementations of direction determination of a wireless tag. Generally, any services, components, modules, methods, and/or operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 4:
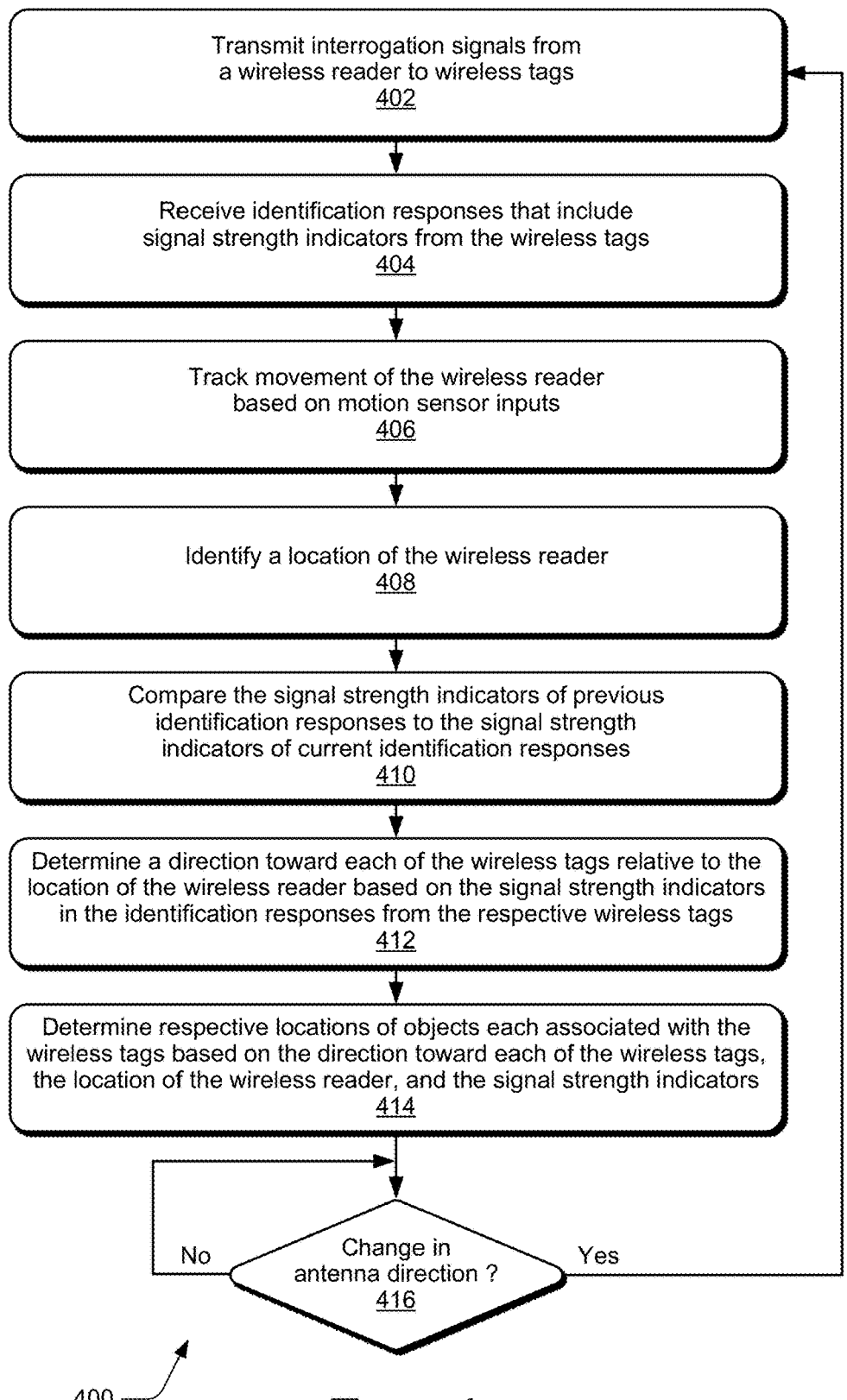
FIG. 4 illustrates an example method of direction determination of a wireless tag in accordance with one or more implementations of the techniques described herein.

FIG. 4 illustrates example method(s) 400 of direction determination of a wireless tag as described herein, and the method is generally described with reference to a mobile device with a RFID reader. The order in which the method is described is not intended to be construed as a limitation, and any number or combination of the described method operations can be performed in any order to perform a method, or an alternate method.

At 402, interrogation signals are transmitted from a wireless reader to wireless tags. For example, the RFID reader 106 implemented with the mobile device 102 transmits the interrogation signals 124 via the antenna 126 (or antenna system) as broadcast messages requesting the RFID tags 302 that are in range to return the identifying data 122 stored in memory 120 of the RFID tags.

At 404, identification responses that include signal strength indicators are received from the wireless tags. For example, the RFID reader 106 implemented with the mobile device 102 receives the identification responses 128 from one or more of the RFID tags 302 responsive to the interrogation signals 124 that are transmitted from the RFID reader. The RFID tag 118 receives an interrogation signal 124 from the RFID reader 106 and then wirelessly communicates the identifying data 122 back to the RFID reader. The identification responses 128 from the RFID tag 118 include the signal strength indicators 130, such as received signal strength indications (RSSI) that indicate the power present in the received radio signals (e.g., the identification responses 128) from the RFID tag 118.

At 406, movement of the wireless reader is tracked based on motion sensor inputs. For example, the tracking module 136 implemented with the mobile device 102 tracks movement of the mobile device, which correlates to movement of the integrated or attached RFID reader 106, based on the motion sensor inputs 138 from the motion sensors 134. The motion sensors 134 (or a single motion sensor) sense motion of the mobile device 102 as a user moves and changes orientations of the device and/or as the mobile device 102 moves with the user to various different locations. The motion sensors 134 can be implemented with various sensors, such as a gyroscope, an accelerometer, and/or other types of motion sensors to sense motion of the mobile device. The various motion sensors 134 may also be implemented as components of an inertial measurement unit in the mobile device.

At 408, a location of the wireless reader is identified. For example, the tracking module 136 implemented with the mobile device 102 identifies the device location 140 of the mobile device, which correlates to the location of the integrated or attached RFID reader 106, based on the known location and/or orientation of the mobile device 102 and the subsequent motion sensor inputs 138 from the motion sensors 134.

At 410, the signal strength indicators of previous identification responses are compared to the signal strength indicators of current identification responses. For example, the tracking module 136 implemented with the mobile device 102 compares the signal strength indicators 130 of previous and current identification responses 128. The device memory 110 maintains the current signal strength indicators 144 as well as the previous signal strength indicators 146 from the received identification responses 128.

At 412, a direction toward each of the wireless tags relative to the location of the wireless reader is determined based on the signal strength indicators in the identification responses from respective ones of the wireless tags. For example, the tracking module 136 implemented with the mobile device 102 determines the wireless tag direction 142 toward the RFID tag 118 from the current device location 140 of the mobile device 102, which correlates to the location of the RFID reader 106, based on the stronger signal strength by comparison of the previous and current identification responses 128. A stronger signal strength indicates that the RFID tag 118 is more aligned with a direction of the antenna 126 of the RFID reader 106, and the wireless tag direction 142 toward each of the one or more RFID tags 302 is relative to the device location 140 and an orientation of the RFID reader.

At 414, respective locations of objects that are each associated with the wireless tags are determined based on the direction toward each of the wireless tags, the location of the wireless reader, and the signal strength indicators. For example, the RFID tag 118 can be associated with any type of object 304, such as for tracking and/or location determination, and the tracking module 136 implemented with the mobile device 102 determines the tagged object location 148 (e.g., of the object 304) based on the wireless tag direction 142 toward the RFID tag 118, the location of the RFID reader as it correlates to the device location 140, and based on the signal strength indicators 130 of the identification responses 128 from the RFID tag 118.

At 416, a determination is made as to whether an antenna direction of an antenna of the wireless reader has changed. For example, the tracking module 136 implemented with the mobile device 102 determines whether the direction and/or orientation of the antenna 126 of the RFID reader 106 has changed based on the motion sensor inputs 138 (e.g., rotational vectors input from the motion sensors 134). The motion sensors 134 generate sensor data vectors having three-dimensional parameters as rotational vectors in x, y, and z coordinates indicating position, location, and/or orientation of the mobile device 102, which correlates to the direction and/or orientation of the antenna 126 of the RFID reader.

If the direction and/or orientation of the antenna 126 of the RFID reader 106 has changed (i.e., "Yes" from 416), then the method 400 continues at 402 to initiate transmitting the interrogation signals 124 from the RFID reader 106 to the RFID tags 302 based on the change of the antenna direction and/or orientation. If the direction and/or orientation of the antenna 126 of the RFID reader 106 has not changed (i.e., "No" from 416), then the tracking module 136 continues to monitor for a change in the direction and/or orientation of the antenna 126 of the RFID reader.

Figure 5:
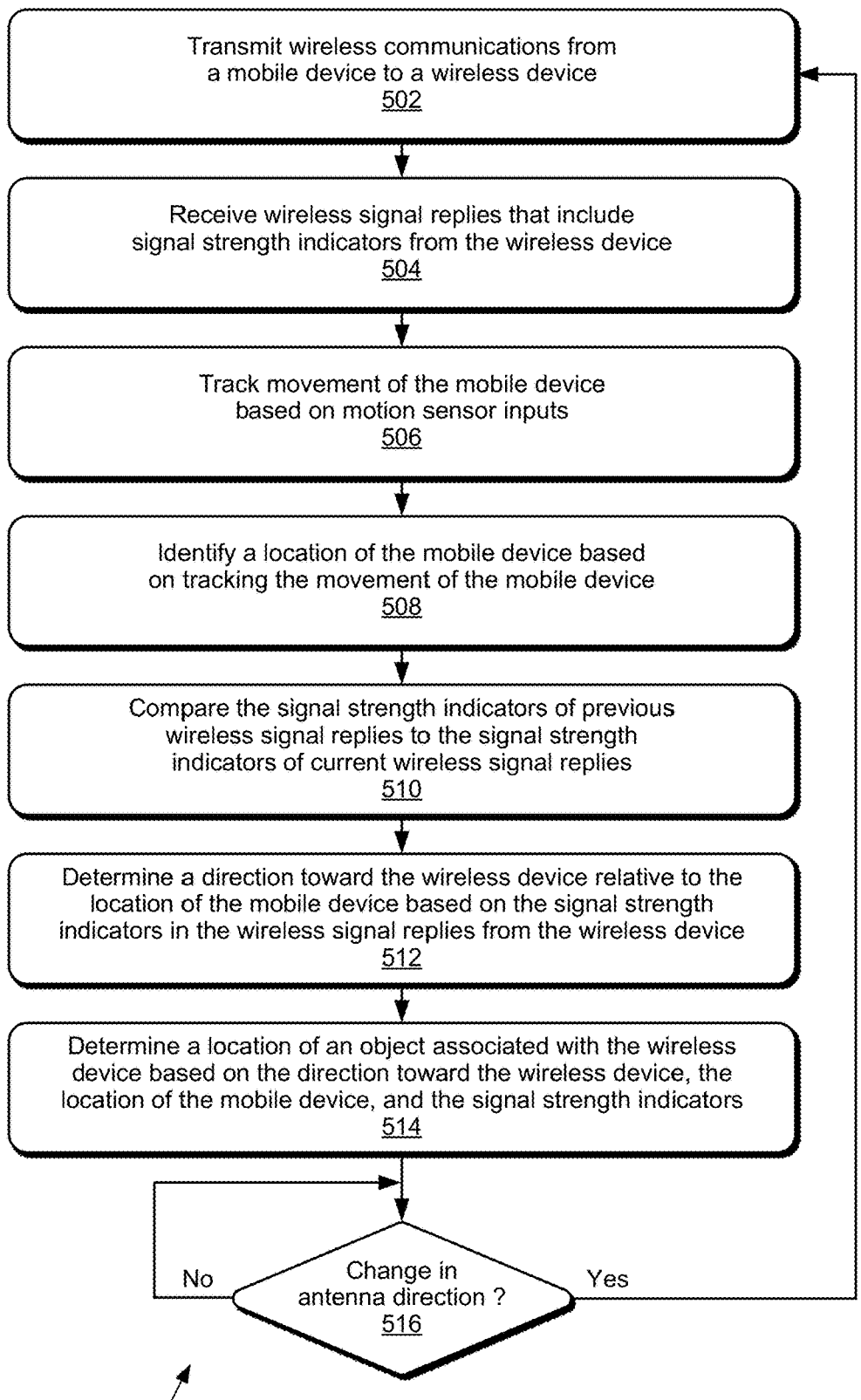
FIG. 5 illustrates an example method of direction determination of a wireless tag in accordance with one or more implementations of the techniques described herein.

FIG. 5 illustrates example method(s) 500 of direction determination of a wireless tag as described herein, and the method is generally described with reference to a mobile device and communication with a wireless tag. The order in which the method is described is not intended to be construed as a limitation, and any number or combination of the described method operations can be performed in any order to perform a method, or an alternate method.

At 502, wireless communications are transmitted from a mobile device to a wireless device. For example, a wireless radio system 132 implemented with the mobile device 102 transmits wireless communications via an antenna system of the wireless radio system as broadcast messages requesting wireless devices that are in range to return identifying data stored in memory of the wireless devices. In implementations, the wireless devices can be various different radio-based, wireless tags for wireless tag signaling, such as with LTE, NFC, and the like.

At 504, wireless signal replies that include signal strength indicators are received from the wireless device. For example, the wireless radio system 132 implemented with the mobile device 102 receives wireless signal replies from one or more of the wireless tags responsive to the wireless communications that are transmitted from the wireless radio system. The wireless tag implemented for wireless tag signaling receives a wireless communication from the wireless radio system 132 and then wirelessly communicates identifying data back to the mobile device 102. The wireless signal replies from the wireless tag include signal strength indicators, such as received signal strength indications (RSSI) that indicate the power present in the received radio signals from the wireless tag.

At 506, movement of the mobile device is tracked based on motion sensor inputs. For example, the tracking module 136 implemented with the mobile device 102 tracks movement of the mobile device based on the motion sensor inputs 138 from the motion sensors 134. The motion sensors 134 (or a single motion sensor) sense motion of the mobile device 102 as a user moves and changes orientations of the device and/or as the mobile device 102 moves with the user to various different locations. The motion sensors 134 can be implemented with various sensors, such as a gyroscope, an accelerometer, and/or other types of motion sensors to sense motion of the mobile device. The various motion sensors 134 may also be implemented as components of an inertial measurement unit in the mobile device.

At 508, a location of the mobile device is identified based on tracking the movement of the mobile device. For example, the tracking module 136 implemented with the mobile device 102 identifies the device location 140 of the mobile device based on the known location and/or orientation of the mobile device 102 and the subsequent motion sensor inputs 138 from the motion sensors 134.

At 510, the signal strength indicators of previous wireless signal replies are compared to the signal strength indicators of current wireless signal replies. For example, the tracking module 136 implemented with the mobile device 102 compares the signal strength indicators of previous and current wireless signal replies from the wireless tag. The device memory 110 maintains current signal strength indicators as well as previous signal strength indicators from the received wireless signal replies. The tracking module 136 comparing the signal strength indicators of the previous and current wireless signal replies is effective to eliminate attenuation caused by an object that at least partially obstructs the communication path of the wireless signal replies from the wireless tag.

At 512, a direction toward the wireless device relative to the location of the mobile device is determined based on the signal strength indicators in the wireless signal replies from the wireless device. For example, the tracking module 136 implemented with the mobile device 102 determines the wireless tag direction 142 toward the wireless tag from the current device location 140 of the mobile device 102 based on the stronger signal strength by comparison of the previous and current wireless signal replies. A stronger signal strength indicates that the wireless tag is more aligned with a direction of the antenna of the wireless radio system, and the wireless tag direction 142 toward each of the one or more wireless tags is relative to the device location 140 and an orientation of the mobile device 102.

At 514, a location of an object associated with the wireless device is determined based on the direction toward the wireless device, the location of the mobile device, and the signal strength indicators. For example, a wireless tag can be associated with any type of an item or object, such as for tracking and/or location determination, and the tracking module 136 implemented with the mobile device 102 determines the tagged object location 148 of an object based on the wireless tag direction 142 toward the wireless tag, the device location 140 of the mobile device 102, and based on the signal strength indicators of the wireless signal replies from the wireless tag.

At 516, a determination is made as to whether an antenna direction of an antenna in the mobile device has been changed. For example, the tracking module 136 implemented with the mobile device 102 determines whether the direction and/or orientation of the antenna of the wireless radio system 132 has changed based on the motion sensor inputs 138 (e.g., rotational vectors input from the motion sensors 134). The motion sensors 134 generate sensor data vectors having three-dimensional parameters as rotational vectors in x, y, and z coordinates indicating position, location, and/or orientation of the mobile device 102.

If the direction and/or orientation of the antenna of the wireless radio system 132 has changed (i.e., "Yes" from 516), then the method 500 continues at 502 to initiate transmitting the wireless communications from the wireless radio system 132 to the wireless tags based on the change of the antenna direction and/or orientation. If the direction and/or orientation of the antenna of the wireless radio system 132 has not changed (i.e., "No" from 516), then the tracking module 136 continues to monitor for a change in the direction and/or orientation of the antenna of the wireless radio system, as it correlates to movement of the mobile device 102.

Figure 6:
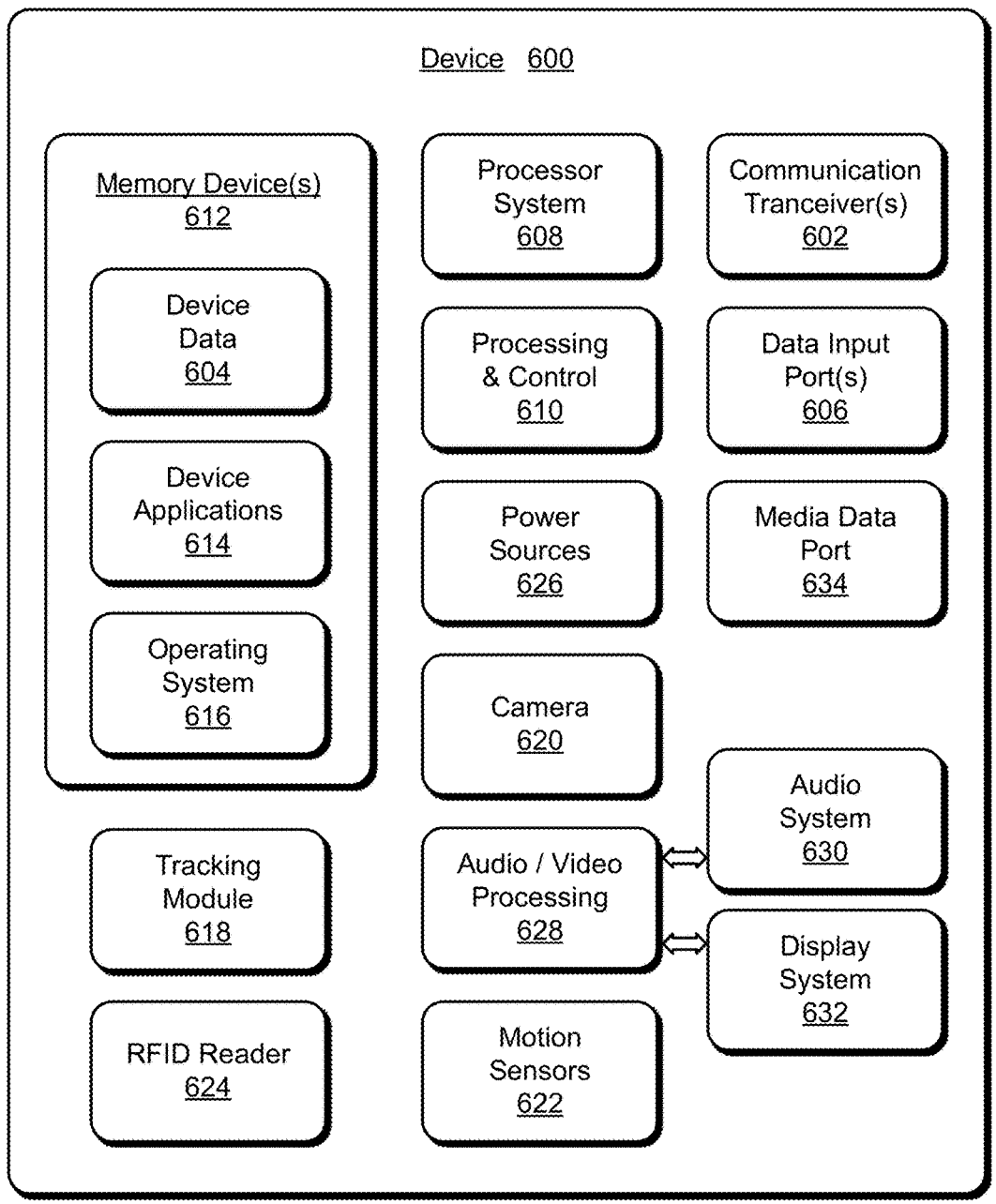
FIG. 6 illustrates various components of an example device that can implement aspects of direction determination of a wireless tag.

FIG. 6 illustrates various components of an example device 600 in which aspects of direction determination of a wireless tag can be implemented. The example device 600 can be implemented as any of the devices described with reference to the previous FIGS. 1-5, such as any type of mobile device, mobile phone, client device, tablet, computing, communication, entertainment, gaming, media playback, and/or other type of electronic device. For example, the mobile device 102 shown and described with reference to FIGS. 1-5 may be implemented as the example device 600.

The device 600 includes communication transceivers 602 that enable wired and/or wireless communication of device data 604 with other devices. The device data 604 can include any of the determined tracking module data, the object location mapping and correlation to particular wireless tags, the current and previous signal strength indicators, and the SVC classifier training data. Additionally, the device data 604 can include any type of audio, video, and/or image data. Example communication transceivers 602 include wireless personal area network (WPAN) radios compliant with various IEEE 802.15 (Bluetooth™) standards, wireless local area network (WLAN) radios compliant with any of the various IEEE 802.11 (WiFi™) standards, wireless wide area network (WWAN) radios for cellular phone communication, wireless metropolitan area network (WMAN) radios compliant with various IEEE 802.16 (WiMAX™) standards, and wired local area network (LAN) Ethernet transceivers for network data communication.

The device 600 may also include one or more data input ports 606 via which any type of data, media content, and/or inputs can be received, such as user-selectable inputs to the device, messages, music, television content, recorded content, and any other type of audio, video, and/or image data received from any content and/or data source. The data input ports may include USB ports, coaxial cable ports, and other serial or parallel connectors (including internal connectors) for flash memory, DVDs, CDs, and the like. These data input ports may be used to couple the device to any type of components, peripherals, or accessories such as microphones and/or cameras.

The device 600 includes a processing system 608 of one or more processors (e.g., any of microprocessors, controllers, and the like) and/or a processor and memory system implemented as a system-on-chip (SoC) that processes computer-executable instructions. The processor system may be implemented at least partially in hardware, which can include components of an integrated circuit or on-chip system, an application-specific integrated circuit (ASIC), a field-programmable gate array (FPGA), a complex programmable logic device (CPLD), and other implementations in silicon and/or other hardware. Alternatively or in addition, the device can be implemented with any one or combination of software, hardware, firmware, or fixed logic circuitry that is implemented in connection with processing and control circuits, which are generally identified at 610. The device 600 may further include any type of a system bus or other data and command transfer system that couples the various components within the device. A system bus can include any one or combination of different bus structures and architectures, as well as control and data lines.

The device 600 also includes computer-readable storage memory 612 (e.g., memory devices) that enable data storage, such as data storage devices that can be accessed by a computing device, and that provide persistent storage of data and executable instructions (e.g., software applications, programs, functions, and the like). Examples of the computer-readable storage memory 612 include volatile memory and non-volatile memory, fixed and removable media devices, and any suitable memory device or electronic data storage that maintains data for computing device access. The computer-readable storage memory can include various implementations of random access memory (RAM), read-only memory (ROM), flash memory, and other types of storage media in various memory device configurations. The device 600 may also include a mass storage media device.

The computer-readable storage memory 612 provides data storage mechanisms to store the device data 604, other types of information and/or data, and various device applications 614 (e.g., software applications). For example, an operating system 616 can be maintained as software instructions with a memory device and executed by the processing system 608. The device applications may also include a device manager, such as any form of a control application, software application, signal-processing and control module, code that is native to a particular device, a hardware abstraction layer for a particular device, and so on.

In this example, the device 600 includes a tracking module 618 that implements aspects of direction determination of a wireless tag, and may be implemented with hardware components and/or in software as one of the device applications 614, such as when the device 600 is implemented as the mobile device 102 described with reference to FIGS. 1-5. An example of the tracking module 618 is the tracking module 136 that is implemented as a software application and/or as hardware components in the mobile device 102. In implementations, the tracking module 618 may include independent processing, memory, and logic components as a computing and/or electronic device integrated with the device 600.

In this example, the device 600 also includes a camera 620 and motion sensors 622, such as may be implemented in an inertial measurement unit (IMU). The motion sensors 622 can be implemented with various sensors, such as a gyroscope, an accelerometer, and/or other types of motion sensors to sense motion of the device. The various motion sensors 622 may also be implemented as components of an inertial measurement unit in the device.

The device 600 also includes a radio-frequency identification (RFID) reader 624 that is implemented to interrogate RFID tags for identifying data and receive identification responses from the RFID tags. An example of the RFID reader 624 is the RFID reader 106 that is implemented as an integrated component of the mobile device 102 or as an attachment that operates with the mobile device. The device 600 can also include one or more power sources 626, such as when the device is implemented as a mobile device. The power sources may include a charging and/or power system, and can be implemented as a flexible strip battery, a rechargeable battery, a charged super-capacitor, and/or any other type of active or passive power source.

The device 600 also includes an audio and/or video processing system 628 that generates audio data for an audio system 630 and/or generates display data for a display system 632. The audio system and/or the display system may include any devices that process, display, and/or otherwise render audio, video, display, and/or image data. Display data and audio signals can be communicated to an audio component and/or to a display component via an RF (radio frequency) link, S-video link, HDMI (high-definition multimedia interface), composite video link, component video link, DVI (digital video interface), analog audio connection, or other similar communication link, such as media data port 634. In implementations, the audio system and/or the display system are integrated components of the example device. Alternatively, the audio system and/or the display system are external, peripheral components to the example device.

Although implementations of direction determination of a wireless tag have been described in language specific to features and/or methods, the subject of the appended claims is not necessarily limited to the specific features or methods described. Rather, the features and methods are disclosed as example implementations of direction determination of a wireless tag, and other equivalent features and methods are intended to be within the scope of the appended claims. Further, various different examples are described and it is to be appreciated that each described example can be implemented independently or in connection with one or more other described examples. Additional aspects of the techniques, features, and/or methods discussed herein relate to one or more of the following:

A mobile device comprising: a wireless reader to transmit interrogation signals requesting that a wireless tag return identifying data stored on the wireless tag, and receive identification responses from the wireless tag, the identification responses including the identifying data and signal strength indicators of the identification responses; a tracking module implemented to: track movement of the mobile device based on motion sensor inputs to identify a location of the mobile device; and determine a direction toward the wireless tag relative to the location of the mobile device based on the signal strength indicators in the identification responses from the wireless tag.

Alternatively or in addition to the above described mobile device, any one or combination of: an antenna of the wireless reader via which the interrogation signals are transmitted and the identification responses are received; the tracking module implemented to: determine a change in antenna direction of the antenna; and initiate the wireless reader to transmit one or more of the interrogation signals to the wireless tag based on the change of the antenna direction. The tracking module is implemented to determine the direction toward the wireless tag relative to the location and an orientation of the mobile device. The tracking module is implemented to determine a location of an object associated with the wireless tag based on the direction toward the wireless tag, the location of the mobile device, and the signal strength indicators. The determined location of the object is usable as a basis to visually represent the object associated with the wireless tag in an augmented reality system. The tracking module is implemented to: compare the signal strength indicators of previous identification responses to the signal strength indicators of current identification responses; and determine the direction toward the wireless tag relative to the location of the mobile device based on the compared signal strength indicators of the previous and current identification responses. The tracking module is implemented to said compare the signal strength indicators of the previous and current identification responses effective to eliminate attenuation caused by an object that at least partially obstructs the identification responses from the wireless tag.

A method comprising: receiving wireless signal replies that include signal strength indicators from a wireless device responsive to wireless communications from a mobile device to the wireless device; tracking movement of the mobile device based on motion sensor inputs to identify a location of the mobile device; and determining a direction toward the wireless device relative to the location of the mobile device based on the signal strength indicators in the wireless signal replies from the wireless device.

Alternatively or in addition to the above described method, any one or combination of: determining a change in antenna direction of an antenna in the mobile device; and initiating one or more of the wireless communications from the mobile device to the wireless device based on the change of the antenna direction. The wireless device is a RFID tag; the mobile device includes a RFID reader and the wireless communications are interrogation signals requesting the RFID tag to return identifying data stored on the RFID tag; and the wireless signal replies from the RFID tag are identification responses that include the identifying data and the signal strength indicators. The determining the direction toward the wireless device is relative to the location and an orientation of the mobile device. Further comprising determining a location of an object associated with the wireless device based on the direction toward the wireless device, the location of the mobile device, and the signal strength indicators. Further comprising utilizing the determined location of the wireless device as a basis to visually represent the object associated with the wireless device in an augmented reality system. Further comprising: comparing the signal strength indicators of previous wireless signal replies to the signal strength indicators of current wireless signal replies; and said determining the direction toward the wireless device relative to the location of the mobile device based on comparing the signal strength indicators of the previous and current wireless signal replies. The comparing the signal strength indicators of the previous and current wireless signal replies is effective to eliminate attenuation caused by an object that at least partially obstructs the wireless signal replies from the wireless device.

A method comprising: receiving identification responses that include signal strength indicators from one or more RFID tags responsive to interrogation signals transmitted from a RFID reader; tracking movement of the RFID reader based on motion sensor inputs to identify a location of the RFID reader; and determining a direction toward each of the one or more RFID tags relative to the location of the RFID reader based on the signal strength indicators in the identification responses from respective ones of the one or more RFID tags.

Alternatively or in addition to the above described method, any one or combination of: determining a change in antenna direction of an antenna of the RFID reader; and initiating the interrogation signals from the RFID reader to the one or more RFID tags based on the change of the antenna direction. The determining the direction toward each of the one or more RFID tags is relative to the location and an orientation of the RFID reader. Further comprising: determining respective locations of objects each associated with the one or more RFID tags based on the direction toward each of the one or more RFID tags, the location of the RFID reader, and the signal strength indicators. Further comprising: comparing the signal strength indicators of previous identification responses to the signal strength indicators of current identification responses; and said determining the direction toward each of the one or more RFID tags relative to the location of the RFID reader based on comparing the signal strength indicators of the previous and current identification responses.

The invention claimed is:

1. A mobile device, comprising:
   a wireless reader to:
      transmit interrogation signals requesting that a wireless tag return identifying data stored on the wireless tag, the identifying data representing an object with the wireless tag physically placed in or affixed to the object; and
      receive current identification responses from the wireless tag, the current identification responses including the identifying data and signal strength indicators of the current identification responses;
   a tracking module implemented to:
      track movement of the mobile device based on motion sensor inputs to identify a location of the mobile device in a three-dimensional space and a rotational orientation of the mobile device in the three-dimensional space;
      compare signal strength indicators for previous identification responses to the signal strength indicators for the current identification responses;
      determine a direction toward the wireless tag in the three-dimensional space relative to the location of the mobile device based on the comparison of the signal strength indicators from the previous identification responses with the signal strength indicators in the current identification responses from the wireless tag, and the rotational orientation of the mobile device in the three-dimensional space;
      output an indication of the direction toward the wireless tag relative to the rotational orientation of the mobile device in the three-dimensional space; and
      determine a location of the object based on the direction toward the wireless tag, the location of the mobile device, and the signal strength indicators from the current identification responses.

2. The mobile device as recited in claim 1, further comprising:
   an antenna of the wireless reader via which the interrogation signals are transmitted and the current identification responses are received;
   the tracking module implemented to:
      determine a change in antenna direction of the antenna;
      initiate the wireless reader to transmit one or more of the interrogation signals to the wireless tag based on the change of the antenna direction.

3. The mobile device as recited in claim 1, wherein the tracking module is implemented to determine a change in the direction toward the wireless tag based on one or more of a change in the location of the mobile device or a change in the rotational orientation of the mobile device.

4. The mobile device as recited in claim 1, wherein the determined location of the object is usable as a basis to visually represent the object associated with the wireless tag in an augmented reality system.

5. The mobile device as recited in claim 1, wherein the tracking module is implemented to said compare the signal strength indicators of the previous and current identification responses effective to reduce attenuation caused by an object that at least partially obstructs the identification responses from the wireless tag.

6. The mobile device as recited in claim 1, further comprising an antenna of the wireless reader via which the interrogation signals are transmitted and the identification responses are received, and wherein the tracking module is further implemented to determine the direction toward the wireless tag based on a known angle of the antenna relative to a plane of the mobile device.

7. The mobile device as recited in claim 1, wherein the tracking module is further implemented to compare the signal strength indicators for the previous identification responses to the signal strength indicators for the current identification responses to determine a relative alignment of the mobile device relative to the wireless tag.

8. The mobile device as recited in claim 1, further comprising a display device, and wherein the determined location of the object is usable as a basis to visually represent the object on the display device and as part of an augmented reality system.

9. A method, comprising:
receiving current wireless signal replies that include current signal strength indicators from a wireless tag responsive to wireless communications from a mobile device to the wireless tag, the wireless tag being physically placed in or affixed to an object;
tracking movement of the mobile device based on motion sensor inputs to identify a location of the mobile device;
determining a rotational orientation of the mobile device in a three-dimensional space at the location;
comparing previous signal strength indicators from previous wireless signal replies to the current signal strength indicators;
determining a direction toward the wireless tag in the three-dimensional space relative to the location of the mobile device based on the comparison of the previous signal strength indicators with the current signal strength indicators from the wireless tag, and the rotational orientation of the mobile device in the three-dimensional space; and
determining a location of the object based on the direction toward the wireless tag, the location of the mobile device, and the current signal strength indicators.

10. The method as recited in claim 9, further comprising:
determining a change in antenna direction of an antenna in the mobile device; and
initiating one or more of the wireless communications from the mobile device to the wireless tag based on the change of the antenna direction.

11. The method as recited in claim 9, wherein:
the wireless tag is a RFID tag;
the mobile device includes a RFID reader and the wireless communications are interrogation signals requesting the RFID tag to return identifying data stored on the RFID tag; and
the current wireless signal replies from the RFID tag are identification responses that include the identifying data and the current signal strength indicators.

12. The method as recited in claim 9, further comprising:
utilizing the determined location of the wireless tag as a basis to visually represent the object associated with the wireless tag in an augmented reality system.

13. The method as recited in claim 9, wherein said comparing the signal strength indicators of the previous and current wireless signal replies is effective to reduce attenuation caused by an object that at least partially obstructs the wireless signal replies from the wireless tag.

14. The method as recited in claim 9, wherein said determining the direction toward the wireless tag is further based on a known angle of the antenna relative to a plane of the mobile device.

15. A method, comprising:
receiving current identification responses that include current signal strength indicators from one or more RFID tags responsive to interrogation signals transmitted from a RFID reader;
tracking movement of the RFID reader in a three-dimensional space based on motion sensor inputs to identify a location of the RFID reader;
determining a rotational orientation of the RFID reader in the three-dimensional space;
comparing previous signal strength indicators for previous identification responses to the current signal strength indicators for the current identification responses;
determining a direction toward each of the one or more RFID tags in the three-dimensional space relative to the location of the RFID reader based on the comparison of the previous signal strength indicators with the current signal strength indicators, and the rotational orientation of the RFID reader in the three-dimensional space; and
determining one or more locations of the one or more RFID tags based on the direction toward the one or more RFID tags, the location of the RFID reader, and the current signal strength indicators.

16. The method as recited in claim 15, further comprising:
determining a change in antenna direction of an antenna of the RFID reader; and
initiating the interrogation signals from the RFID reader to the one or more RFID tags based on the change of the antenna direction.

17. The method as recited in claim 15, further comprising:
determining respective locations of objects each associated with the one or more RFID tags based on the direction toward each of the one or more RFID tags, the location of the RFID reader, and the signal strength indicators.

18. The method as recited in claim 15, wherein the RFID reader is part of a mobile device, and wherein said determining the direction toward each of the one or more wireless tags is further based on a known angle of an antenna of the mobile device relative to a plane of the mobile device.

19. The method as recited in claim 15, further comprising utilizing the determined one or more locations of the one or more RFID tags as a basis to visually represent the one or more RFID tags in an augmented reality system.

20. The method as recited in claim 15, wherein said comparing the previous signal strength indicators to the current signal strength indicators is effective to reduce attenuation caused by an object that at least partially obstructs the identification responses from the wireless tag.

* * * * *